(12) United States Patent
Lundin

(10) Patent No.: US 8,687,654 B1
(45) Date of Patent: Apr. 1, 2014

(54) METHOD TO PACKETIZE AN ENCODED VIDEO FRAME

(75) Inventor: Henrik Fahlberg Lundin, Sollentuna (SE)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 13/344,173

(22) Filed: Jan. 5, 2012

(51) Int. Cl.
*H04J 3/24* (2006.01)

(52) U.S. Cl.
USPC .......................... 370/473; 370/230; 370/394

(58) Field of Classification Search
USPC .......... 370/229, 230, 389, 394, 473, 474, 476
See application file for complete search history.

(56) References Cited

U.S. PATENT DOCUMENTS

| | | | |
|---|---|---|---|
| 6,590,902 B1 | 7/2003 | Suzuki et al. | |
| 6,778,553 B1 * | 8/2004 | Chou | 370/465 |
| 7,180,901 B2 * | 2/2007 | Chang et al. | 370/395.64 |
| 8,462,654 B1 * | 6/2013 | Gieger et al. | 370/252 |
| 2005/0259690 A1 * | 11/2005 | Garudadri et al. | 370/477 |
| 2009/0110055 A1 * | 4/2009 | Suneya | 375/240.01 |
| 2009/0213940 A1 * | 8/2009 | Steinbach et al. | 375/240.27 |
| 2013/0039410 A1 * | 2/2013 | Tan et al. | 375/240.02 |

\* cited by examiner

*Primary Examiner* — Kwang B Yao
*Assistant Examiner* — Nguyen Ngo
(74) *Attorney, Agent, or Firm* — Young Basile Hanlon & MacFarlane P.C.

(57) ABSTRACT

A system, method and apparatus for transmitting a packetized video stream over a network comprising receiving a frame of a video stream having a plurality of partitions of varying sizes, the plurality of partitions having an ordered sequence, identifying one or more of the plurality of partitions having a size that is less than a predetermined maximum, and allocating the identified one or more of the plurality of partitions into a plurality of packets in a manner that: (a) results in each packet having a size that is less than the predetermined maximum; (b) minimizes a cost value that is based at least in part on the difference between the size of the smallest packet and the size of the largest packet; and (c) maintains the allocated partitions in the ordered sequence. After allocation, the packets are transmitted over the network.

20 Claims, 11 Drawing Sheets

US 8,687,654 B1

METHOD TO PACKETIZE AN ENCODED VIDEO FRAME

TECHNICAL FIELD

The present invention relates in general to video encoding and decoding.

BACKGROUND

Digital video streams typically represent video using a sequence of frames (i.e. still images). An increasing number of applications today make use of digital video stream encoding for purposes other than traditional moving pictures (such as movies and video clips).

SUMMARY

Disclosed herein are embodiments of systems, methods, and apparatuses for transmitting a packetized video stream over a network, including receiving at a computer a frame of a video stream having a plurality of partitions of varying sizes, the plurality of partitions having an ordered sequence, identifying one or more of the plurality of partitions having a size that is less than a predetermined maximum, and allocating the identified one or more of the plurality of partitions into a plurality of packets in a manner that (a) results in each of the plurality of packets having a size that is less than the predetermined maximum, (b) minimizes a cost value that is based at least in part on the difference between the size of the smallest one of the plurality of packets and the size of the largest one of the plurality of packets and (c) maintains the allocated partitions in the ordered sequence. The plurality of packets is transmitted over the network.

Another aspect of the disclosed embodiments is a method for identifying one or more of the plurality of partitions having a size that exceeds the predetermined maximum, and for each such partition, splitting the identified partition into two or more sub-partitions, each having a size less than the predetermined maximum, and allocating the two or more sub-partitions into a plurality of packets so that the order of the sub-partitions is not changed and no packet exceeds the predetermined maximum.

A further aspect of the disclosed embodiments is an apparatus for transmitting a packetized video stream over a network, comprising a memory and a processor operative to execute instructions stored in memory to receive a frame of a video stream having a plurality of partitions of varying sizes, the plurality of partitions having an ordered sequence, identify one or more of the plurality of partitions having a size that is less than a predetermined maximum, allocate the identified one or more of the plurality of partitions into a plurality of packets in a manner that (a) results in each of the plurality of packets having a size that is less than the predetermined maximum, (b) minimizes a cost value that is based at least in part on the difference between the size of the smallest one of the plurality of packets and the size of the largest one of the plurality of packets and (c) maintains the allocated partitions in the ordered sequence, and transmit the packets over the network.

A yet further aspect of the disclosed embodiments is a processor operative to execute instructions stored in memory to identify one or more of the plurality of partitions having a size that exceeds the predetermined maximum, for each such partition, split the identified partition into two or more sub-partitions each having a size less than the predetermined maximum, and allocate the two or more sub-partitions into a plurality of packets so that the order of the sub-partitions is not changed and no packet exceeds the predetermined maximum.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

Digital video streams can include formats such as VP8, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10). These formats encode digital video for transmission or storage, typically performing one or more types of compression to reduce the size of the resulting bitstream. One thing these formats may have in common is that an encoded video frame or image can be output from the encoder in partitions, each of which may represent a portion of the video frame or image. The contents of these partitions may then be reformatted to fit into the data or payload portion of packets for subsequent transmission or storage. The data portions of the packets are typically of a fixed size, which may be larger or smaller than the partitions. The partitions themselves are typically variably sized and depend upon encoding parameters which vary the compression ratios of the video data and the addition, for example, of forward error correction data to the partition. Transmission, storage and decoding efficiency can depend at least in part upon apportioning the partition data to fill the packets optimally while heeding constraints introduced by the decoding process. These constraints can include maintaining uniform packet data size, maintaining the order in which partition data is emitted from the encoder and starting new partition data in a new packet. What may be desired then is a way to apportion encoded video partition data among packets so that the difference in size between the smallest data packets and the largest data packets is minimized and new partitions always start a new packet.

Figure 1:
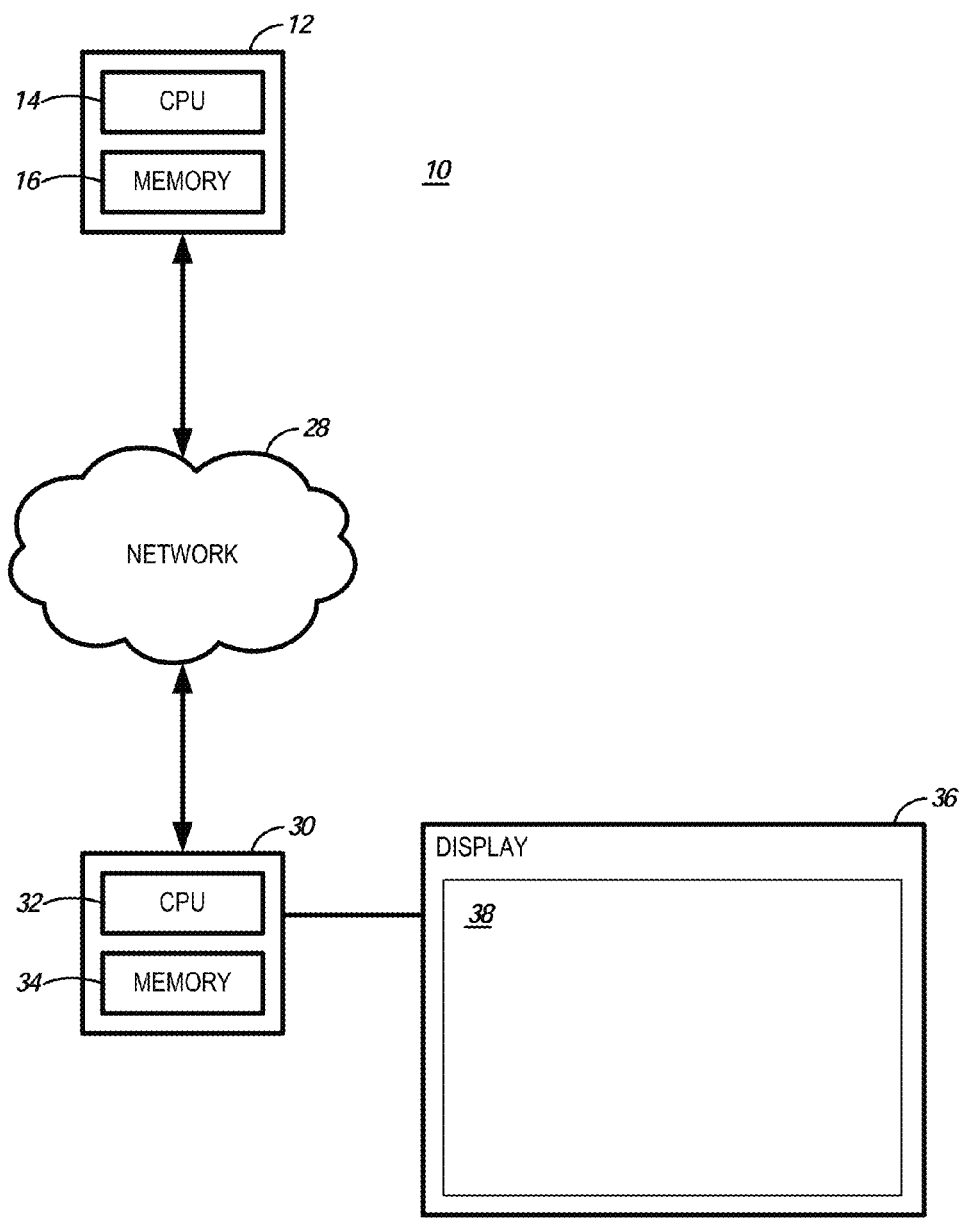
FIG. 1 is a schematic of a video encoding and decoding system.

FIG. 1 is a schematic of a video encoding and decoding system 10. An example of a transmitting station 12 can be, for example, a computer having an internal configuration of hardware including a processor such as a central processing unit (CPU) 14 and a memory 16. CPU 14 can be a controller for controlling the operations of the transmitting station 12. CPU 14 is connected to the memory 16 by, for example, a memory bus. Memory 16 can be random access memory (RAM) or any other suitable memory device. Memory 16 can store data and program instructions which are used by CPU 14. Other suitable implementations of the transmitting station 12 are possible. For example, the processing of transmitting station 12 can be distributed among multiple devices.

A network 28 connects transmitting station 12 and receiving station 30 for encoding and decoding of a video stream. Specifically, a video stream can be encoded in transmitting station 12 and an encoded video stream can be decoded in receiving station 30. Network 28 can, for example, be the Internet. Network 28 can also be a local area network (LAN), wide area network (WAN), virtual private network (VPN), or any other means of transferring the video stream from transmitting station 12.

Receiving station 30, in one example, can be a computer having an internal configuration of hardware including a processor such as a central processing unit (CPU) 32 and a memory 34. CPU 32 is a controller for controlling the operations of the receiving station 30. CPU 32 can be connected to the memory 34 by, for example, a memory bus. Memory 34 can be RAM or any other suitable memory device. Memory 34 stores data and program instructions which are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD) or a cathode-ray tube (CRT). Display 36 can be configured to display a video stream decoded at the receiving station 30. Other implementations of encoder and decoder system 10 are possible. For example, one implementation can omit network 28 and/or display 36. In implementations, a video stream can be encoded and then stored for transmission at a later time by receiving station 30 or any other device having memory. In another implementation, additional components can be added to encoder and decoder system 10. For example, a display or a video camera can be attached to transmitting station 12 to capture the video stream to be encoded.

Figure 2:
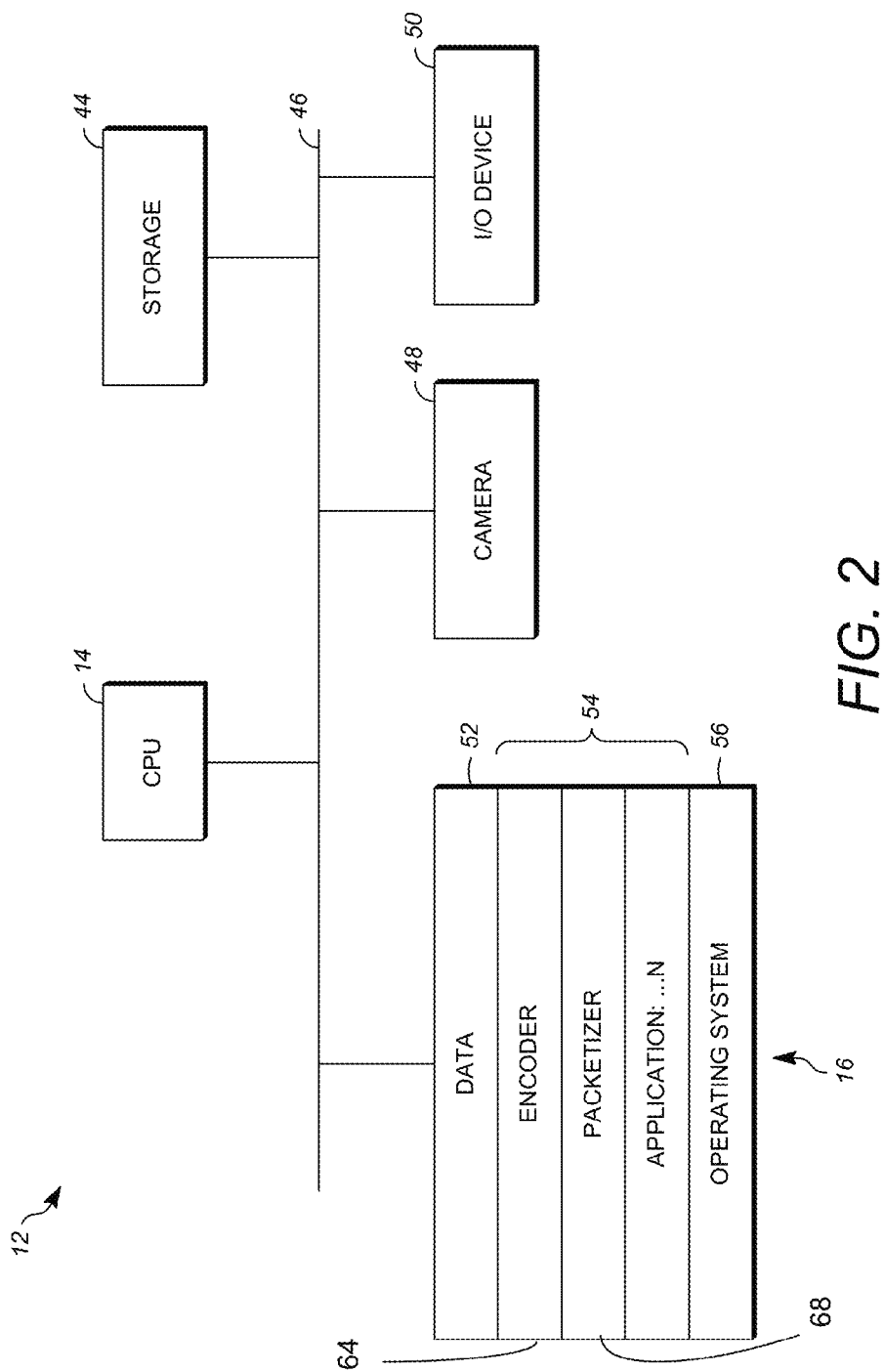
FIG. 2 is a diagram of a computer system.

FIG. 2 is a schematic showing transmitting station 12 as may be implemented in an embodiment of this disclosure. FIG. 2 shows transmitting station (or computer 12) having a CPU 14 operative to access data and instructions stored in memory 16. Items stored in memory 16 can include an operating system 56, data 52 and various application programs 54 which may include an encoder 64, a packetizer 68 and other application programs. Computer 12 can also include one or more persistent storage devices 44 such as a disk drive, one or more I/O devices 50 such as displays or network interfaces and possibly a camera 48 for acquiring video data.

Figure 3:
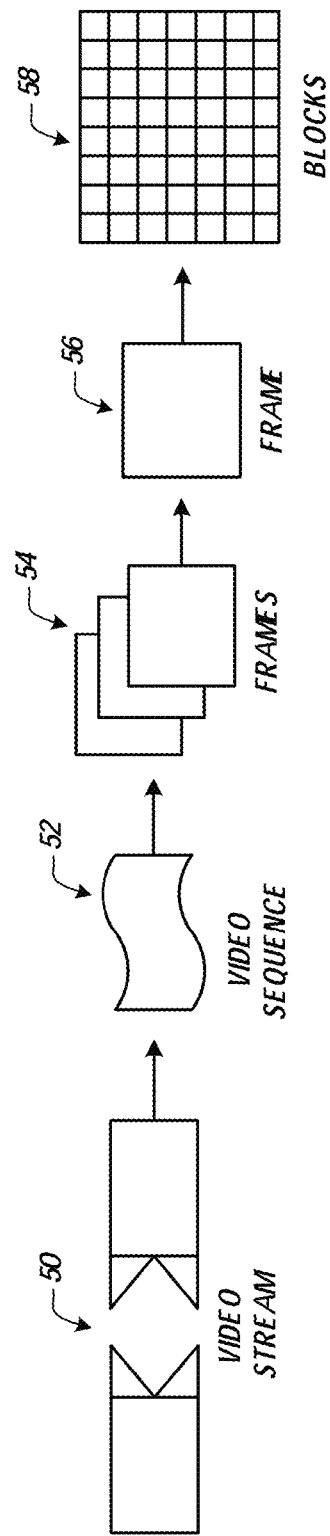
FIG. 3 is a diagram of a video stream.

FIG. 3 is a diagram of a typical video stream 50 to be encoded and decoded. Video stream 50 includes a video sequence 52. At the next level, video sequence 52 includes a number of adjacent frames 54. While three frames are depicted in adjacent frames 54, video sequence 52 can include any number of adjacent frames. Adjacent frames 54 can then be further subdivided into a single frame 56. At the next level, single frame 56 can be divided into a series of blocks 58, which can contain data corresponding to, for example, a 16×16 pixel group of displayed pixels in the frame 56. Each block can contain luminance and chrominance data for the corresponding pixels. Blocks 58 can also be of any other suitable size such as 16×8 pixel groups or 8×16 pixel groups.

Figure 4:
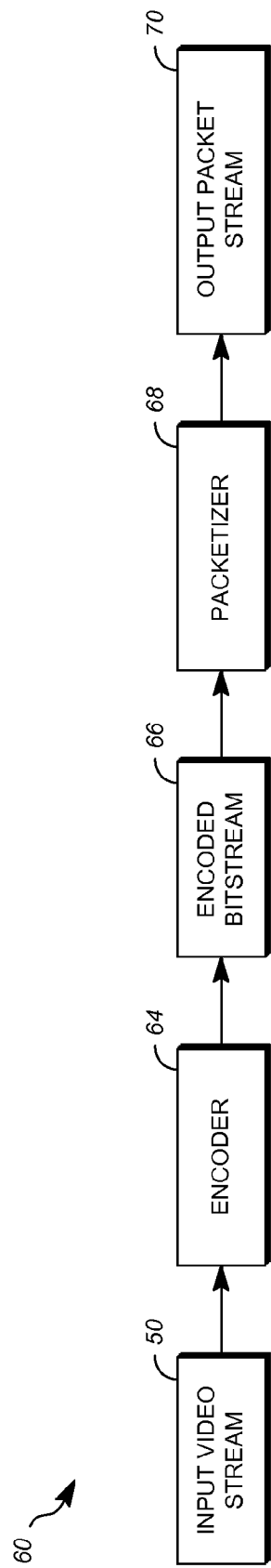
FIG. 4 is a diagram showing a video stream encoded and packetized according to an embodiment of this disclosure.

FIG. 4 is a block diagram of a video encoding system 60 in accordance with an embodiment of this disclosure. Encoder 60 can be implemented, as described previously, in the transmitting station 12 using the CPU 14. Encoder 60 encodes a video stream 50. When video stream 50 is presented for encoding, each frame 56 within video stream 50 is processed in units of blocks. Encoding system 60 has the following stages to perform the various functions to produce an output packet stream 70: an encoder stage 64 which produces an encoded bitstream 66 of partitions from video stream 50, and a packetizer stage 68 which packetizes encoded bitstream 66 to create output packet stream 70. The encoded bitstream 66 is packetized into packets in order to prepare the encoded bitstream 66 for transmission over a network or storage. Other structural variations of encoder 60 can be used to encode video stream 50.

Partitions included in encoded bitstream 66 are emitted by encoder 64 in an ordered sequence which corresponds to the order in which blocks 58 belonging to video stream 50 are processed by encoder. This ordered sequence of partitions should be maintained when packetizing encoded bitstream 66 since this is the order in which a decoder will be expecting to receive partitions. Any change in the ordered sequence of partitions would require that a decoder be adapted to handle the change in sequence. By maintaining the ordered sequence of partitions through the packetization and transmission process, the transmitted output packet stream 70 can be decoded without requiring modifications to the decoder.

Packetization—First Pass

Figure 5:
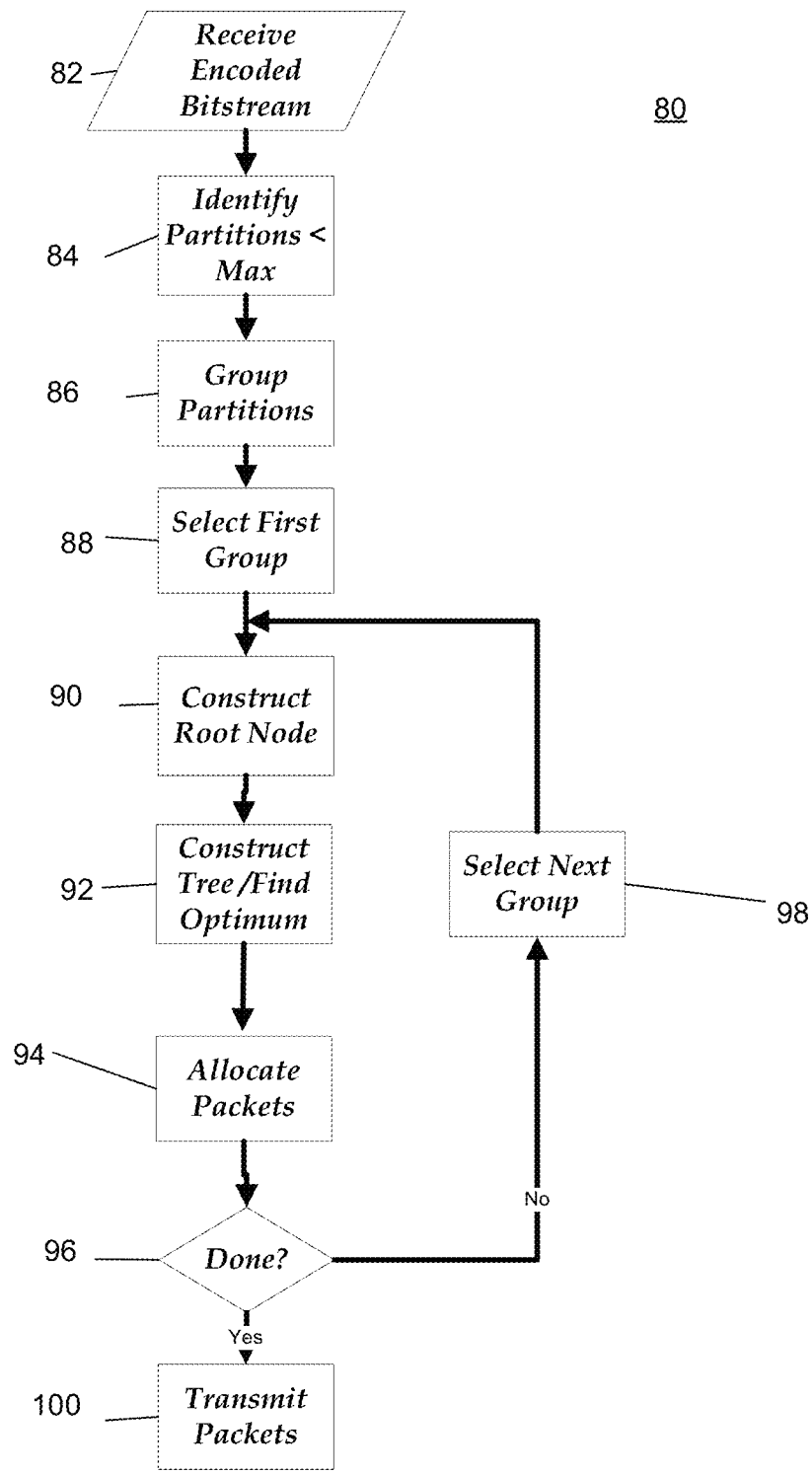
FIG. 5 is a flowchart showing aspects of packetization according to an embodiment of this disclosure.

FIG. 5 is a flowchart showing a packetization process 80 in accordance with an embodiment of this disclosure. Embodiments of this disclosure perform the packetization process by examining the input compressed bitstream to detect partitions which may be smaller than the packet payload size and optimally allocating the partitions to packets by constructing a binary tree based on the partition size and using it to determine the optimal distribution of partitions to packets. Packetization 80 begins by receiving an encoded bitstream 66 at step 82. Receiving an encoded bitstream can involve acquiring a video stream 50 from camera 48 which communicates with CPU 14 via the bus 46, or from the storage device 44, the memory 16, or possibly from the network 28.

As described above, encoded bitstream 66 is divided into one or more partitions by the encoding process. Packetization 80 examines these partitions at step 84 to identify partitions which are smaller in size than the packet payload size. Identifying partitions involves comparing the size of the partition in bits and comparing it to the packet payload size. Packet payload size is the number of bits available to store data in a packet not including the packet overhead such as the header and possibly checksum information. The packet payload size may vary from time to time depending upon network conditions or other variables; however it is predetermined and remains constant for processing a particular frame 56. Once partitions smaller than the packet payload size have been identified, the identified partitions are examined to group together partitions which are all smaller than the packet payload size and are contiguous in the ordered sequence in which they occur in the encoded bitstream 66 in step 86 to create groups of adjacent, identified partitions. In step 88 the first group of adjacent, identified partitions is selected for processing.

Processing of grouped, identified partitions proceeds in step 90 by first creating a node corresponding to the root node of a binary tree using information from the first partition of the group. Contents of a node are shown in Table 1, below. In step 92 a binary tree is constructed and is traversed to determine an optimal allocation of partitions to packets which allocates all partitions to packets, preserves the order of the partitions in the packets and minimizes the difference in size between the largest packet and smallest packet. Allocation of a partition to a packet includes copying bits which comprise the partition data to the payload area of the packet for subsequent storage or transmission. Partitions may also be divided into smaller sub-partitions, in which case allocation of the sub-partition includes copying the bits which comprise the sub-partition data to the payload area of the packet.

Following this, in step 94 the partitions are allocated to packets and packetization 80 then checks in step 96 to see if all groups of partitions have been processed. If not, in step 98 the next group of adjacent partitions is selected and packetization 80 returns to step 90 where a new binary tree is constructed and an optimal solution to that tree is found. If it is determined in step 96 that all partitions have been processed, in step 100 the packets are then transmitted or stored for later transmission or decoding.

Figure 6:
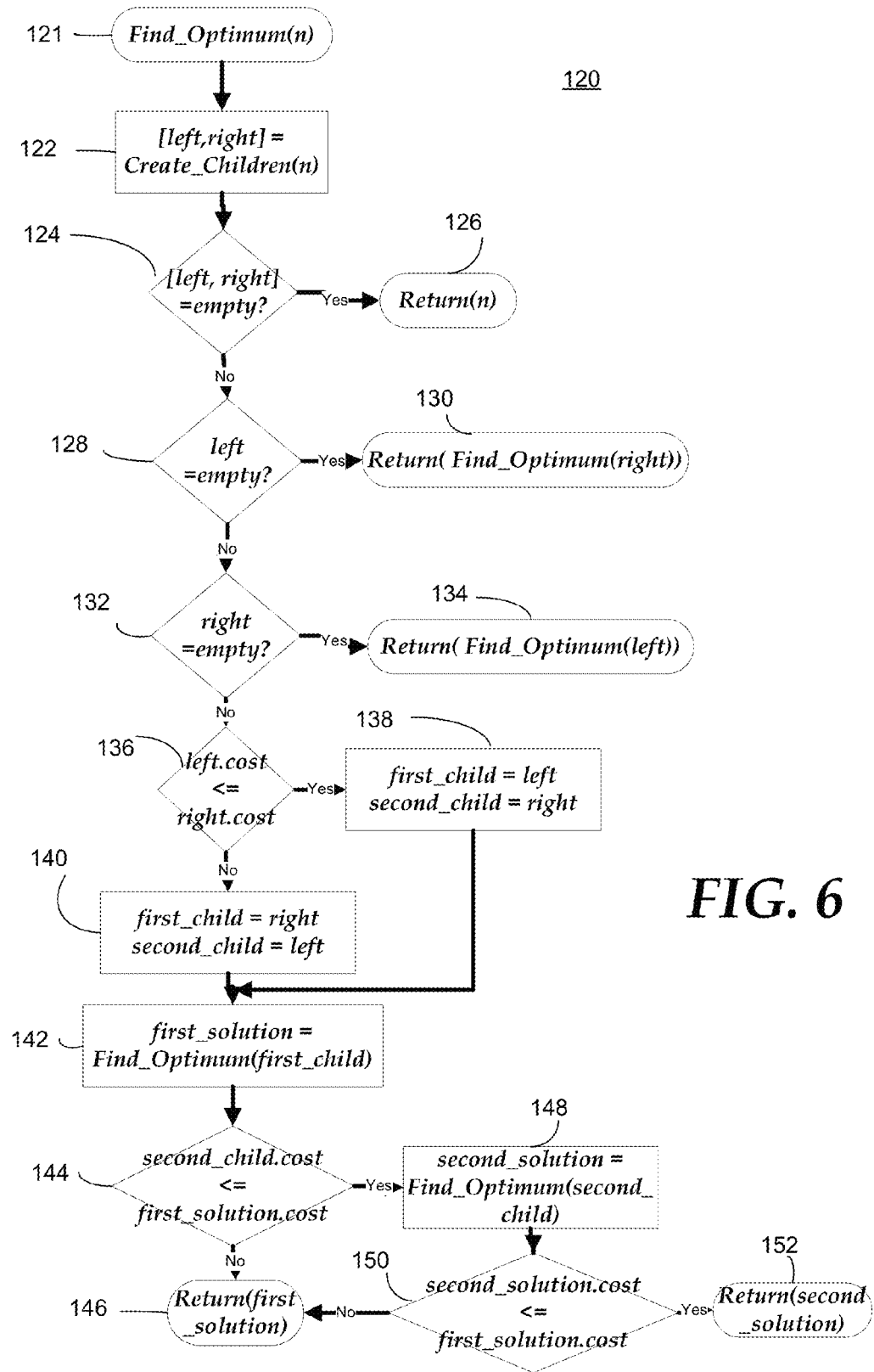
FIG. 6 is a flowchart showing aspects of creating a binary tree according to an embodiment of this disclosure.

FIG. 6 is a flowchart showing binary tree optimization 120. Binary tree optimization 120 constructs a binary tree for each group of adjacent partitions in the input encoded video stream and calculates a cost function for each node as the tree is constructed and traversed. Binary tree optimization 120 is initially called with an argument equal to the root node which corresponds to the first partition in the group and adds subsequent nodes corresponding to each partition in the group. A node is a data structure with the properties as shown in Table 1. Binary tree optimization 120 constructs a binary tree and calculates an optimal solution by recursively creating nodes and evaluating a cost function for each node. Binary tree optimization 120 is entered by making a call to the Find_Optimum(n) routine with an argument equal to the root node for the tree to be optimized in step 121. In step 122 the binary tree optimization 120 attempts to create children for this node. The child creating process is described in relation to FIG. 7, below.

In step 124, if no children are created it means that no more partitions exist to be allocated so in step 126 the process returns the node (n) with which it was called. In step 128, the left child is tested to see if it is null or empty. If the left child is empty it cannot be a solution so the process returns the right child in step 130. If the right child is found to be empty in step 132 it cannot be a solution so the process returns the left child in step 134. If both children contain partition data the process checks in step 136 to see if the left child cumulative cost is less than or equal to the right child cumulative cost. If the left child represents a less costly solution, the left child is labeled first_child and the right child is labeled second_child in step 138, otherwise in step 140 the right child is labeled first_child and the left child is labeled second_child.

In step 142, binary tree optimization 120 calls itself recursively to find a solution to the optimization problem for the sub-tree starting at the first_child. The recursive call returns at step 144 with the cumulative cost for the sub-tree represented by the first_child rolled up into the first_solution node. At step 144, the cumulative cost of the first_solution is compared to the current cumulative cost for the second_child. If the cost of the second child is already greater than the first_solution, it cannot be made less costly by adding more nodes, so the routine is finished and returns the first solution in step 146. If the second_child cost is less than or equal to the first_solution, the process again recursively calls itself to optimize the sub-tree which may depend upon the second_child in step 148. In step 150, the second_solution node returned by the Find_Optimum(second_child) call is examined to determine which of the first_solution and second_solution represents the lowest cost solution. Either the first_solution is returned in step 146 or the second_solution in step 152. When called with the root node of the binary tree to be optimized and the partitions to be allocated, binary tree optimization 120 returns a binary tree node which represents the lowest cost solution to allocating partitions among fixed size packets according to the cost function selected.

Create_Children

Figure 7:
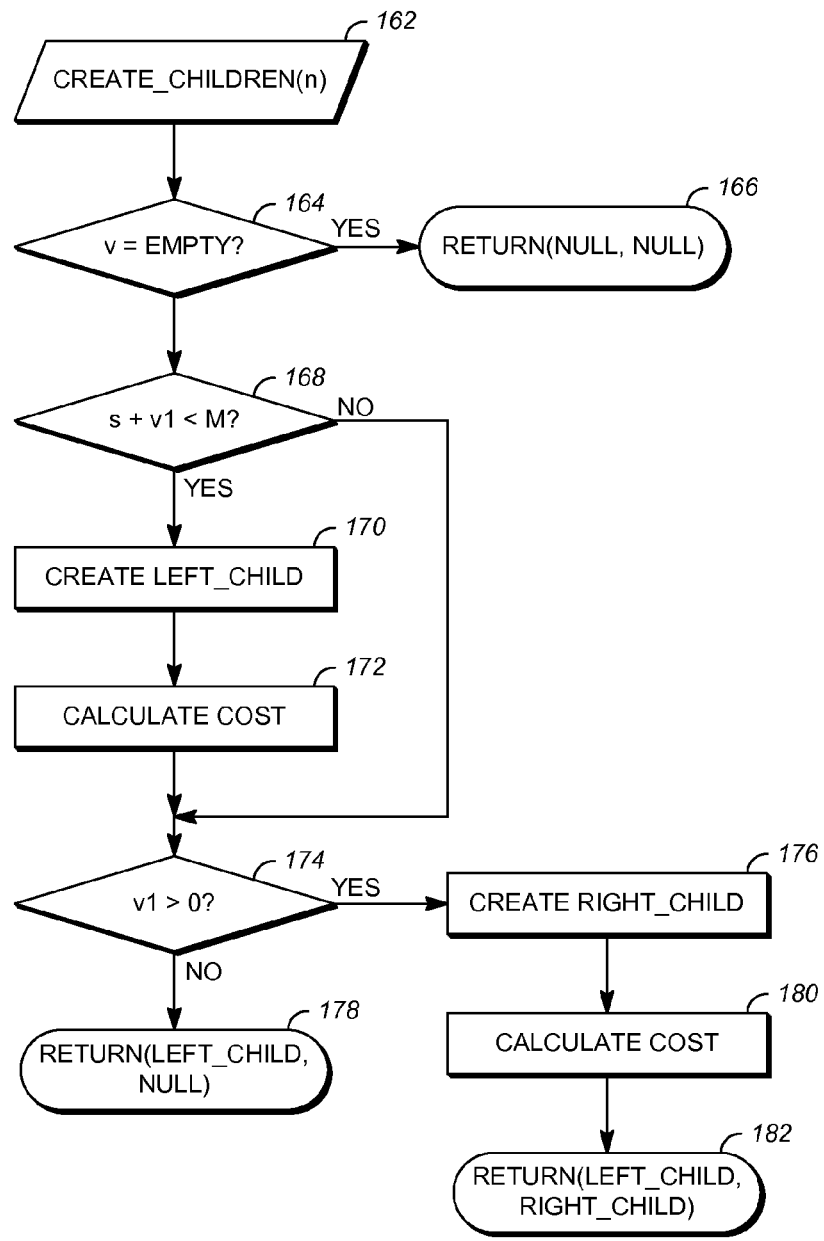
FIG. 7 is a flowchart showing aspects of creating children in a binary tree according to an embodiment of this disclosure.

FIG. 7 is a flowchart showing a process to create children 160 in an embodiment of this disclosure. Create children 160 begins at step 162 by inputting arguments which are contained in a node data structure. Nodes of the binary tree are data structures with properties as shown in Table 1.

TABLE 1

| PROPERTY | SYMBOL | DESCRIPTION |
| --- | --- | --- |
| Parent | p | The node immediately above this node in the tree. |
| Children | c = [c0, c1] | The children of this node. |
| Size | s | The accumulated size of partitions since the last packet boundary |
| Partition size vector | v = [v1, v2,...vk] | Vector of partition sizes to be processed |
| Max parent size | s_max | Largest packet size above this node in tree. |
| Min parent size | s_min | Smallest packet size above this node in tree. |
| Cost | c | Cumulative cost for this tree branch |

The input to create children 160 is a node passed as an argument to a Create_Children(n) function call 162. The input node is examined to see if the input size vector (v) is empty in step 164. If v is empty there are no more partitions to be allocated so create children 160 returns two null pointers showing that no nodes were created in step 166. If the vector is not empty processing proceeds to step 168 where the cumulative size of the partitions in the current packet along this branch of the tree (s) is added to the size of the current partition (v1) and compared to the maximum payload size for the packets (M). If the current partition will fit in the current packet, the "yes" branch is taken and a left child is created in step 170 and the cost calculated in step 172. Child creation and cost calculation will be described below. In step 174, the size of the current partition is checked to see if it is empty. If the partition is not empty, a right child is created in step 176. This is equivalent to starting a new packet with the current partition. If the partition is empty, the "no" exit is taken from step 174 and the process returns at step 178 with a possibly non-null left child. Once the right child is created in step 176, the cost function is calculated in step 180 and the process the returns both children in step 182. A child node is created by creating a node data structure as shown in Table 1 and setting the values appropriately. A left child represents a node where the current partition is being added to a packet containing previous partitions. A right child represents a partition which starts a new packet with no previous partition information stored in it. A left child, labeled node C0, is created by setting the properties of the node data structure as follows:

TABLE 2

| PROPERTY | VALUE | DESCRIPTION |
| --- | --- | --- |
| Parent | C0.p = n | Set parent node = current parent |
| Children | C0.c = [null, null] | The children of this node = NULL |
| Size | C0.s = s + v1 | New cumulative size = cumulative size + current partitions size |
| Partition size vector | C0.v = [v2, v3,...vk] | Vector of partition sizes remaining to be processed |
| Max parent size | C0.s_max = s_max | Largest packet size above this node in tree. |
| Min parent size | C0.s_min = s_min | Smallest packet size above this node in tree. |
| Cost | C0.c | To be calculated |

A right child, labeled node C1, is initialized as follows:

TABLE 3

| PROPERTY | VALUE | DESCRIPTION |
| --- | --- | --- |
| Parent | C1.p = n | Set parent node = current parent |
| Children | C1.c = [null, null] | The children of this node = NULL |
| Size | C1.s = v1 | New cumulative size = current partitions size |
| Partition size vector | C1.v = [v2, v3,...vk] | Vector of partition sizes remaining to be processed |
| Max parent size | C1.s_max = max{s_max, s} | Largest packet size above this node in tree. |
| Min parent size | C1.s_min = min{s_min, s} | Smallest packet size above this node in tree. |
| Cost | C1.c | To be calculated |

A cost function associated with a node can be calculated by calculating the largest difference in packet size plus a fixed overhead per packet. If P(n) is the number of packets along a branch of the tree from the root node to the current node "n", and the packet overhead cost is Z, the cost is calculated as follows for a solution node, meaning that the node has no children:

$$\text{Cost} = P(n)*Z + \max\{n.s\_max, n.s\} - \min\{n.s\_min, n.s\}, \quad (1)$$

where max and min are functions that return the maximum or minimum value of the arguments, respectively. If the node is a non-solution node, meaning that it has children, a lower bound for the cost is calculated as follows:

$$\text{Partial Cost} = P(n)*Z + \max\{n.s\_max, n.s\} - n.s\_min, \quad (2)$$

where the variables s_max and s_min are initialized with the values:

$$s\_max = 0, \text{ and} \quad (3)$$

$$s\_min = \text{MAX\_VALUE}. \quad (4)$$

MAX_VALUE is a constant larger than any possible value for sizes of partitions or packets. Values for s_max and s_min are initialized prior to processing the partitions. When the processing of partitions smaller than the packet payload size is complete, the variables s_max and s_min of the solution node will contain the largest and smallest packet sizes allocated.

Figure 8A:
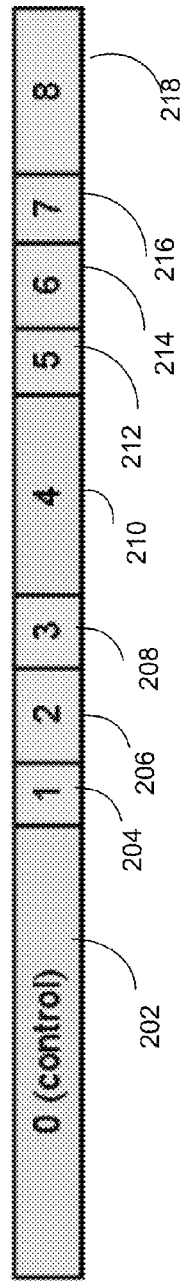
FIG. 8A is a diagram showing partitions to be packetized.
Figure 9C:
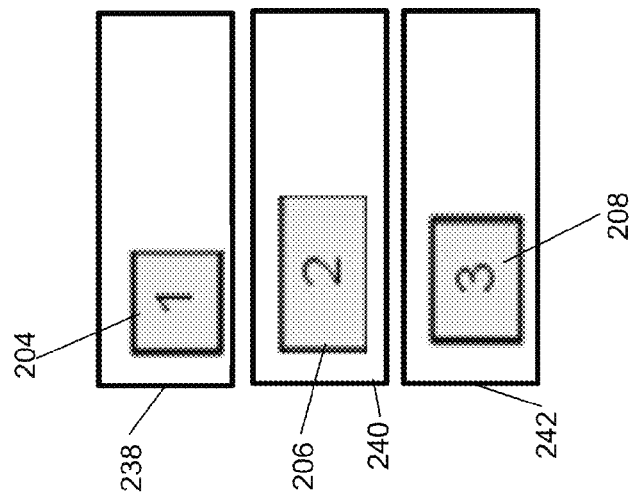
FIG. 9C is a diagram showing packetization according to an embodiment of this disclosure.
Figure 9B:
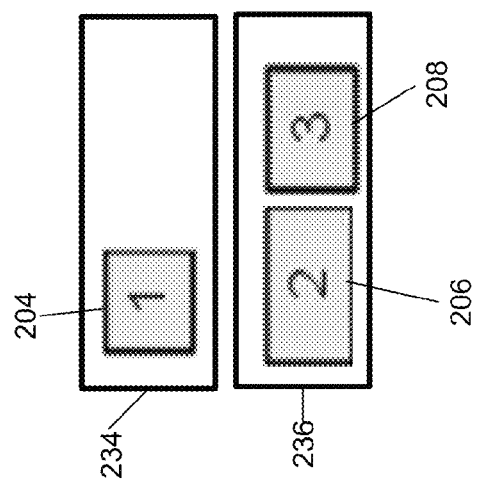
FIG. 9B is a diagram showing packetization according to an embodiment of this disclosure.
Figure 9A:
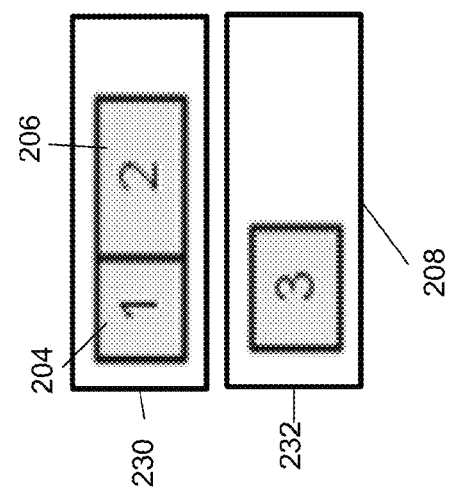
FIG. 9A is a diagram showing packetization according to an embodiment of this disclosure.

FIG. 8A shows a portion of an encoded video stream 200 with partitions 0 (202) and 4 (210) larger than packet payload size 220 and partitions 1 (204), 2 (206), 3 (208), 5 (212), 6 (214), 7 (216) and 8 (218) smaller than packet payload size 220. FIGS. 9A, 9B and 9C show three possible allocations for partitions 1 (204), 2 (206) and 3 (208) according to embodiments of this disclosure described above. In FIG. 9A, partitions 1 (204) and 2 (206) are allocated to packet 230 and partition 3 (208) is allocated to packet 232. In FIG. 9B, partition 1 (204) is allocated to packet 234 and partitions 2 (206) and 3 (208) are allocated to packet 236. FIG. 9C shows partition 1 (204) allocated to packet 238, partition 2 (206) allocated to packet 240 and partition 3 allocated to packet 242.

Figure 10:
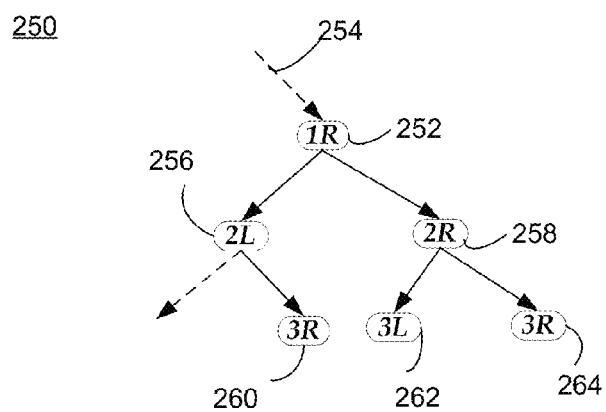
FIG. 10 is a binary tree formed in accordance with embodiments of this disclosure.

FIG. 10 shows a binary tree 250 that describes the partition allocations shown in FIGS. 9A, 9B and 9C. Root node 252 is labeled as a "right" node since the first partition in a group always starts a new packet and is indicated by the dashed line 254. Following the root node, left child node 256 indicates that there is room in the first packet 230 for both first partition 204 and second partition 206. Right child node 258 indicates that, alternatively, second partition 206 could be allocated to the next packet 236 or 240. In the case where second partition 206 is allocated to the same packet 230 as first partition 204 at node 256, the only remaining allocation is to allocate third partition 208 to a new packet 232 as shown by node 260, which is the right child of node 256. In the case where second partition 206 is allocated to a new packet 236 or 240 as indicated by node 258, third partition 208 could be either allocated to the same packet 236 as second partition 206 as represented by left child 262 of node 258 or start a new packet 242 as represented by right child 264 of node 258.

Embodiments of this disclosure calculate a cost function based on the difference between the largest packet and the smallest packet for branches of the binary tree and output the leaf node with the lowest cost function as described in relation to FIG. 6. In the example given here, the lowest cost allocation for these partitions is the allocation shown in FIG. 9C where each of the partitions is allocated a packet. This allocation increases the number of packets by one over the alternative allocations shown in FIGS. 9A and 9B, but makes the difference between the largest packet payload and the smallest packet payload minimal. In the calculation of the cost function the advantage of even packet size may outweigh the disadvantage of adding an additional packet.

Packetization—Second Pass

Embodiments of this disclosure also handle cases where partitions to be allocated to packets are larger than the payload packet size in a second processing pass. Inputs to this second processing pass include the payload packet size and the largest and smallest packet sizes resulting from the first processing pass which allocates partitions smaller than the packet payload as described above. In the second processing pass partitions larger than the packet payload are divided into equally sized sub-partitions with the additional constraint that the size of the sub-partitions should be between the largest and smallest packets from pass one in size whenever possible. This will help to maintain the optimal allocation of partitions to packets by keeping the difference between the minimum packet payload size and the maximum packet payload size bounded.

Figure 8B:
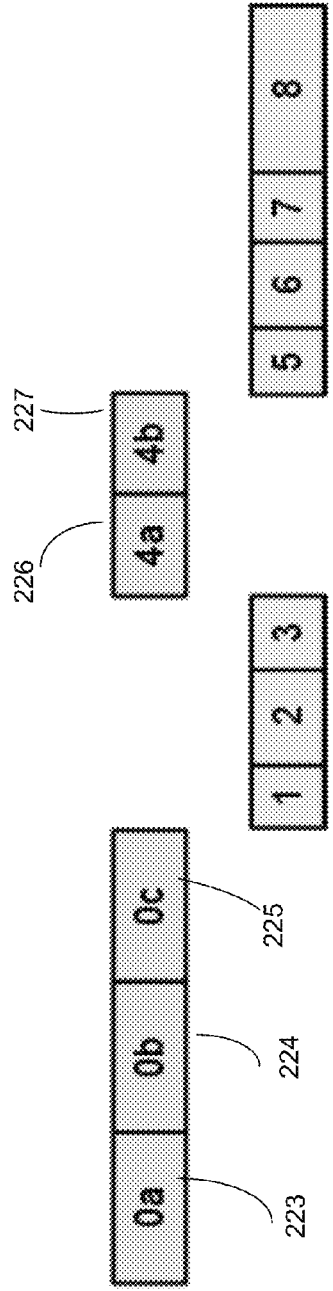
FIG. 8B is a diagram showing sub-partitions formed from large partitions.

In FIG. 8A, encoded video stream 200 is comprised of partitions 0 through 8. Partitions 0 (202) and 4 (210) are larger than packet payload size 220 and partitions 1-3 (204, 206 and 208) and 5-8 (212, 214, 216 and 218) are smaller than packet payload size 220. In FIG. 8B, partition 0 (202) has been divided into three equally sized sub-partitions 0a (223), 0b (224) and 0c (225) and partition 4 (210) has been divided into two equally sized sub-partitions 4a (226) and 4b (227) according to embodiments of this disclosure. Dividing the partitions larger than the packet payload size into equally sized sub-partitions within the s_min and s_max bounds prior to allocating the sub-partitions to packets provides efficient transmission and decoding of an encoded video stream.

Figure 11:
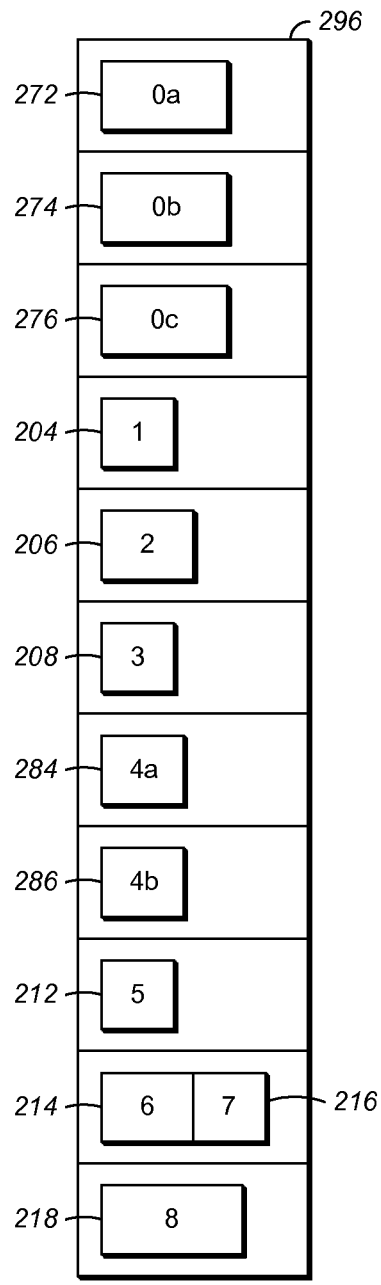
FIG. 11 is a diagram showing packetization according to an embodiment of this disclosure.

Embodiments of this disclosure allocate partitions smaller or equal to the packet payload size in a first pass by performing binary tree optimization first as disclosed above and then in a second pass divides the partitions which are larger than the payload packet size into equal sub-partitions preferably bounded by the minimum and maximum packet sizes from the first pass and allocates them among packets. FIG. 11 shows an example of an allocation of the partitions shown in FIG. 8B allocated to an ordered series of similarly sized packets 296 according to an embodiment of this disclosure. In FIG. 11, first partition 0 (202) is larger than packet payload size 220 and has been divided into three sub-partitions: 0a (272), 0b (274) and 0c (276), each allocated to one of the packets 296. The next three partitions, 1 (204), 2 (206) and 3 (208) are smaller than packet payload size 220 and have been allocated to packets 296 using a binary tree search with a cost function as described above. Partition 4 (210), also larger than packet payload size 220, is divided into two sub-partitions 4a (284) and 4b (286) and allocated to partitions 296. Partition 5 (212) starts a new packet, but the partitions 6 (214) and 7 (216) are allocated to a single packet followed by partition 8 (218) in the next packet using a binary tree search with a cost function as described above. The allocated, packetized partitions 272, 274, 276, 204, 206, 208, 284, 286, 214, 216 and 218 can be output for transmission or storage in the order in which they were received by the packetization process.

The embodiments of encoding and decoding described above illustrate some exemplary encoding and decoding techniques. However, it is to be understood that encoding and decoding, as those terms are used in the claims, could mean compression, decompression, transformation, or any other processing or change of data.

The embodiments of the transmitting station 12 and/or the receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of the transmitting station 12 and the receiving station 30 do not necessarily have to be implemented in the same manner.

Further, in one embodiment, for example, the transmitting station 12 or the receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein. Alternatively, the transmitting station 12 can be implemented on a server and the receiving station 30 can be implemented on a device separate from the server, such as a hand-held communications device (i.e. a cell phone). In this instance, the transmitting station 12 can encode content using an encoder 60 into an encoded signal and transmit the encoded signal to the communications device. Alternatively, the communications device can decode content stored locally on the communications device, i.e. content that was not transmitted by the transmitting station 12. Other suitable transmitting station 12 and receiving station 30 implementation schemes are available. For example, the receiving station 30 can be a generally stationary personal computer rather than a portable communications device and/or a device including an encoder 60.

Further, all or a portion of embodiments of the present disclosure can take the form of a computer program product accessible from, for example, a computer-usable or computer-readable medium such as memory 16 or persistent storage 44. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

Embodiments of this disclosure include a memory 16 and a processor 14 operative to execute instructions stored in the memory 16. Embodiments of this disclosure can implement receiving a frame of a video stream having a plurality of partitions of varying sizes with a computer, identifying one or more of the plurality of partitions having a size that is less than a predetermined maximum, allocating the identified one or more of the plurality of partitions into a plurality of packets so that the order of the partitions is not changed, no packet exceeds the maximum and a cost value based at least in part on the difference in size between the smallest packet and the largest packet is minimized and transmitting the packets over the network by creating instructions which can be stored in memory 12 to be accessed and executed by a CPU 12.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for transmitting a packetized video stream over a network, comprising:
   receiving, at a computer, a frame of a video stream having a plurality of partitions of varying sizes, the plurality of partitions having an ordered sequence;
   identifying one or more of the plurality of partitions having a size that is less than a predetermined maximum;
   allocating the identified one or more of the plurality of partitions into a plurality of packets in a manner that (a) results in each of the plurality of packets having a size that is less than the predetermined maximum; (b) minimizes a cost value that is based at least in part on the difference between the size of the smallest one of the plurality of packets and the size of the largest one of the plurality of packets; and (c) maintains the allocated partitions in the ordered sequence; and
   transmitting the plurality of packets over the network.

2. The method of claim 1 further comprising:
   identifying one or more of the plurality of partitions having a size that exceeds the predetermined maximum;

for each such partition, splitting the identified partition into two or more sub-partitions each having a size less than the predetermined maximum; and allocating the two or more sub-partitions into a plurality of packets so that the order of the sub-partitions is not changed and no packet exceeds the predetermined maximum.

3. The method of claim 1, wherein the cost value is based at least in part on the total number of packets.

4. The method of claim 1, wherein allocating each of the plurality of partitions further comprises:
identifying at least a plurality of possible allocations of the identified one or more partitions;
determining the cost value for each of the identified plurality of possible allocations;
selecting one of the plurality of possible allocations based on its determined cost value; and
allocating each of the plurality of the identified one or more partitions into the plurality of packets based on the selected one of the plurality of possible allocations.

5. The method of claim 4, where identifying at least a plurality of possible allocations of the plurality of partitions further comprises:
constructing a binary tree having a plurality of nodes in which node represents an allocation of a partition to a packet.

6. The method of claim 5, wherein determining the cost value for each of the identified possible allocations of the plurality partitions further comprises:
determining a partial cost value for each of the plurality of nodes.

7. The method of claim 6, wherein the partial cost value is determined for a node n using the results obtained by the equation:

$$P(n)*Z+\max(n.s\_max, n.s)-n.s\_min;\text{ wherein}$$

P(n) is the number of packets started along the path from the root node to the node n,
Z is the packet overhead cost for the node n,
max is a function that returns the maximum value of the arguments,
n.s_max is the maximum packet size of the packets along the path from the root node to the node n,
n.s_min is the minimum packet size of the packets along the path from the root node to the node n, and
n.s is the accumulated packet size.

8. The method of claim 5, wherein constructing a binary tree further comprises:
starting with a root node, recursively adding left and right children wherein the right child represents an allocation of a partition to a new packet and the left child represents an allocation of a partition to a current packet.

9. The method of claim 2 wherein the allocating the identified one or more of the plurality of partitions having a size less than a predetermined maximum occurs before allocating the two or more sub-partitions into a plurality of packets.

10. The method of claim 9 wherein the allocated partitions are transmitted over the network in the same order in which they were received.

11. An apparatus for transmitting a packetized video stream over a network, comprising:
a memory; and
a processor operative to execute instructions stored in memory to:
receive a frame of a video stream having a plurality of partitions of varying sizes, the plurality of partitions having an ordered sequence;
identify one or more of the plurality of partitions having a size that is less than a predetermined maximum;
allocate the identified one or more of the plurality of partitions into a plurality of packets in a manner that (a) results in each of the plurality of packets having a size that is less than the predetermined maximum; (b) minimizes a cost value that is based at least in part on the difference between the size of the smallest one of the plurality of packets and the size of the largest one of the plurality of packets; and (c) maintains the allocated partitions in the ordered sequence; and
transmit the plurality of packets over the network.

12. The apparatus of claim 11 further comprising:
the processor operative to execute instructions stored in the memory to:
identify one or more of the plurality of partitions having a size that exceeds the predetermined maximum;
for each such partition, split the identified partition into two or more sub-partitions each having a size less than the predetermined maximum; and
allocate the two or more sub-partitions into a plurality of packets so that the order of the sub-partitions is not changed and no packet exceeds the predetermined maximum.

13. The apparatus of claim 11, where in the cost value is based at least in part on the total number of packets.

14. The apparatus of claim 11, wherein the processor is operative to execute instructions stored in the memory to allocate the identified one or more of the plurality of partitions by:
identifying at least a plurality of possible allocations of the identified one or more partitions;
determining the cost value for each of the identified plurality of possible allocations;
selecting one of the plurality of possible allocations based on its determined cost value; and
allocating each of the plurality of the identified one or more partitions into the plurality of packets based on the selected one of the plurality of possible allocations.

15. The apparatus of claim 14, where identifying at least a plurality of possible allocations of the plurality of partitions further comprises:
constructing a binary tree having a plurality of nodes in which node represents an allocation of a partition to a packet.

16. The apparatus of claim 15, wherein determining the cost value for each of the identified possible allocations of the plurality of partitions further comprises:
determining a partial cost value for each of the plurality of nodes.

17. The apparatus of claim 16, wherein the processor is operative to execute instructions to determine the partial cost value for a node n using the results obtained by the equation:

$$P(n)*Z+\max(n.s\_max, n.s)-n.s\_min;\text{ wherein}$$

P(n) is the number of packets started along the path from the root node to the node n, Z is the packet overhead cost for the node n, max is a function that returns the maximum value of the arguments, n.s_max is the maximum packet size of the packets along the path from the root node to the node n, n.s_min is the minimum packet size of the packets along the path from the root node to the node n, and n.s is the accumulated packet size.

18. The apparatus of claim 15, wherein constructing a binary tree further comprises:
starting with a root node, recursively adding left and right children wherein the right child represents an allocation of a partition to a new packet and the left child represents an allocation of a partition to a current packet.

19. The apparatus of claim 12 wherein the processor is operative to execute instructions stored in the memory to allocate the identified one or more of the plurality of partitions having a size less than a predetermined maximum before executing the instructions to allocate the two or more sub-partitions into a plurality of packets.

20. The apparatus of claim 19 wherein the allocated partitions are transmitted over the network in the same order in which they were received.

* * * * *